(12) United States Patent
Litwinowicz et al.

(10) Patent No.: US 9,174,730 B2
(45) Date of Patent: Nov. 3, 2015

(54) AUTOMATED ROTATING TAIL ROTOR CONTROL

(71) Applicant: Sikorksy Aircraft Corporation, Stratford, CT (US)

(72) Inventors: Anthony Litwinowicz, Derby, CT (US); James Rigsby, Fort Worth, TX (US); Cody Fegely, Milford, CT (US); Mark W. Scott, Bethany, CT (US); John Knag, Milford, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 242 days.

(21) Appl. No.: 13/972,369

(22) Filed: Aug. 21, 2013

(65) Prior Publication Data

US 2015/0053815 A1    Feb. 26, 2015

(51) Int. Cl.
*B64C 27/82* (2006.01)
(52) U.S. Cl.
CPC ......... *B64C 27/82* (2013.01); *B64C 2027/8236* (2013.01); *B64C 2027/8272* (2013.01)
(58) Field of Classification Search
CPC   B64C 27/52; B64C 27/82; B64C 2027/8236; B64C 2027/8272
See application file for complete search history.

(56) References Cited

U.S. PATENT DOCUMENTS

| 3,404,737 A | 10/1968 | Keder, Jr. |
| 7,651,050 B2 | 1/2010 | Lappos et al. |
| 7,874,526 B2 | 1/2011 | Boczar et al. |
| 7,942,365 B2 | 5/2011 | Palcic et al. |
| 8,777,152 B2 * | 7/2014 | Thomassey ................ 244/17.13 |
| 2007/0118254 A1 | 5/2007 | Barnes et al. |
| 2010/0230547 A1 | 9/2010 | Tayman |
| 2010/0324758 A1 | 12/2010 | Piasecki et al. |
| 2012/0012693 A1 | 1/2012 | Thomassey |
| 2012/0160954 A1 | 6/2012 | Thomassey |
| 2012/0312915 A1 | 12/2012 | Sonneborn |

OTHER PUBLICATIONS

International Search Report for application PCT/US14/52028, dated May 28, 2015, 13 pages.
PCT Written Opinion for application PCT/US14/52028, dated May 28, 2015, 5 pages.

* cited by examiner

*Primary Examiner* — Brian M O'Hara
(74) *Attorney, Agent, or Firm* — Cantor Colburn LLP

(57) ABSTRACT

Embodiments are directed to causing, by a computing device comprising a processor, a rotating tail rotor to operate in a tail rotor mode when an aircraft is operating at a speed less than a rudder control power threshold, receiving, by the computing device, a command that indicates a request to transition the aircraft, determining, by the computing device, that a rudder of the aircraft has control power in an amount greater than a second threshold based on receiving the command, and causing, by the computing device, the rotating tail rotor to operate in a pusher propeller mode based on determining that the rudder has control power in the amount greater than the second threshold.

20 Claims, 3 Drawing Sheets

AUTOMATED ROTATING TAIL ROTOR CONTROL

BACKGROUND

A tail rotor on an aircraft (e.g., rotorcraft) is used to provide anti-torque and directional control. When the tail rotor is rotated aft to a pusher propeller orientation, an aircraft vertical stabilizer and rudder provide anti-torque and directional control. The back-and-forth transition of directional control between the tail rotor and the rudder creates an additional burden on the operator or pilot to monitor the anti-torque and decide when to perform the transition. In particular, a pilot decelerating to low speed while the tail rotor is in the pusher configuration and not transitioning directional control between the tail rotor and the rudder in a timely manner can result in loss of directional control.

BRIEF SUMMARY

An embodiment is directed to a method comprising: causing, by a computing device comprising a processor, a rotating tail rotor to operate in a tail rotor mode when an aircraft is operating at a speed less than a rudder control power threshold, receiving, by the computing device, a command that indicates a request to transition the aircraft, determining, by the computing device, that a rudder of the aircraft has control power in an amount greater than a second threshold based on receiving the command, and causing, by the computing device, the rotating tail rotor to operate in a pusher propeller mode based on determining that the rudder has control power in the amount greater than the second threshold.

An embodiment is directed to an apparatus comprising: at least one processor, and memory having instructions stored thereon that, when executed by the at least one processor, cause the apparatus to: cause a rotating tail rotor to operate in a tail rotor mode when an aircraft is operating at a speed less than a threshold, receive a command that indicates a request to transition the aircraft, determine that a rudder of the aircraft has control power in an amount greater than a second threshold based on receiving the command, and cause the rotating tail rotor to operate in a pusher propeller mode based on determining that the rudder has control power in the amount greater than the second threshold.

An embodiment is directed to a system comprising: at least one sensor configured to measure aircraft speed, and a control computer configured to: cause a rotating tail rotor to operate in a tail rotor mode when an aircraft is operating at a speed less than a threshold as detected by the at least one sensor, receive a command that indicates a request to transition the aircraft, determine that a rudder of the aircraft has control power in an amount greater than a second threshold based on receiving the command, cause the rotating tail rotor to operate in a pusher propeller mode based on determining that the rudder has control power in the amount greater than the second threshold, determine that the rudder has control power in an amount less than a third threshold when the rotating tail rotor is operating in the pusher propeller mode, and cause the rotating tail rotor to operate in the tail rotor mode based on determining that the rudder has control power in the amount less than the third threshold.

Additional embodiments are described below.

BRIEF DESCRIPTION OF THE DRAWINGS

The present disclosure is illustrated by way of example and not limited in the accompanying figures in which like reference numerals indicate similar elements.

DETAILED DESCRIPTION

Figure 1:
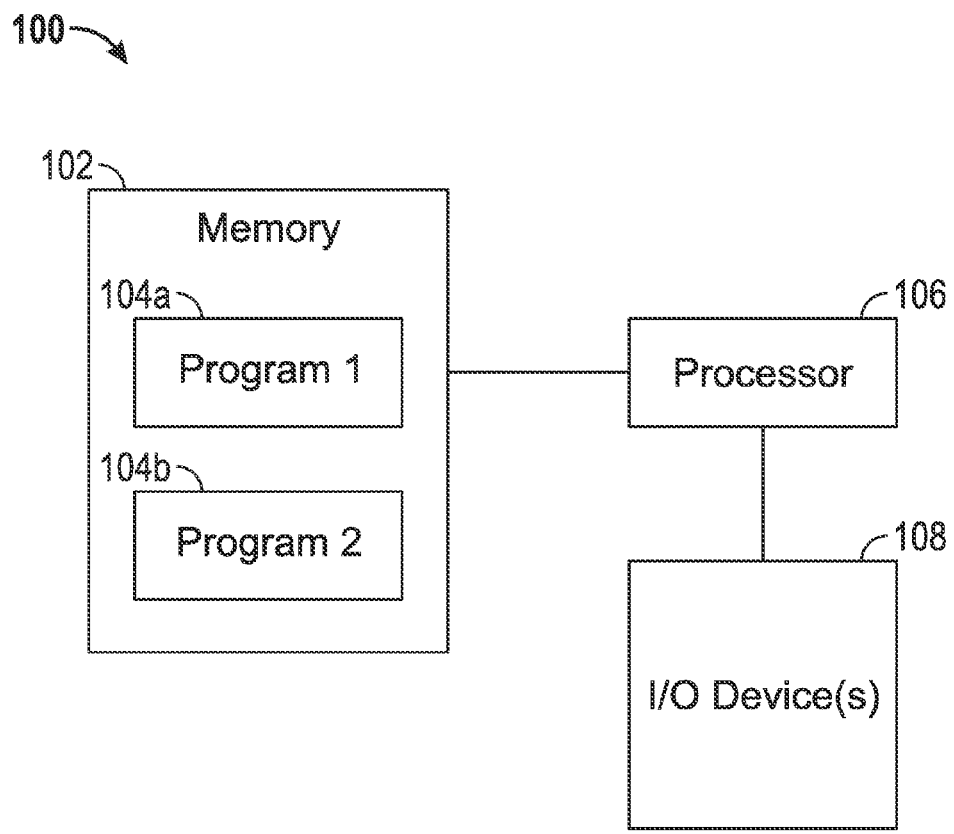
FIG. 1 is a schematic block diagram illustrating an exemplary computing system.

It is noted that various connections are set forth between elements in the following description and in the drawings (the contents of which are included in this disclosure by way of reference). It is noted that these connections in general and, unless specified otherwise, may be direct or indirect and that this specification is not intended to be limiting in this respect. In this respect, a coupling between entities may refer to either a direct or an indirect connection.

Exemplary embodiments of apparatuses, systems, and methods are described for easing the burden on a pilot and increasing the safety of a swiveling or rotating tail rotor through automatic rotating tail rotor control. In some embodiments, a transition between a high speed, pusher propeller mode and a low speed, tail rotor mode may be controlled. Control laws may automatically control transition of the rotating tail rotor to the pusher propeller mode when airspeed and a collective position indicate that a rudder is capable of maintaining directional control. In the event that the rudder is subsequently incapable of maintaining directional control (e.g., in the case of failure), the control laws may automatically transition the rotating tail rotor from the pusher propeller mode back to the tail rotor mode. The transition from the pusher propeller mode to the tail rotor mode may be based on the rudder approaching a control limit indicating a loss of control power.

Referring to FIG. 1, an exemplary computing system 100 is shown. The system 100 is shown as including a memory 102. The memory 102 may store executable instructions. The executable instructions may be stored or organized in any manner and at any level of abstraction, such as in connection with one or more applications, processes, routines, methods, etc. As an example, at least a portion of the instructions are shown in FIG. 1 as being associated with a first program 104a and a second program 104b.

The instructions stored in the memory 102 may be executed by one or more processors, such as a processor 106. The processor 106 may be coupled to one or more input/output (I/O) devices 108. In some embodiments, the I/O device(s) 108 may include one or more of a keyboard or keypad, a touchscreen or touch panel, a display screen, a microphone, a speaker, a mouse, a button, a remote control, a control stick, a joystick, a printer, etc. The I/O device(s) 108 may be configured to provide an interface to allow a user to interact with the system 100.

The system 100 is illustrative. In some embodiments, one or more of the entities may be optional. In some embodiments, additional entities not shown may be included. For example, in some embodiments the system 100 may be associated with one or more networks. In some embodiments, the entities may be arranged or organized in a manner different from what is shown in FIG. 1. One or more of the entities shown in FIG. 1 may be associated with one or more of the devices or entities described herein.

Figure 2:
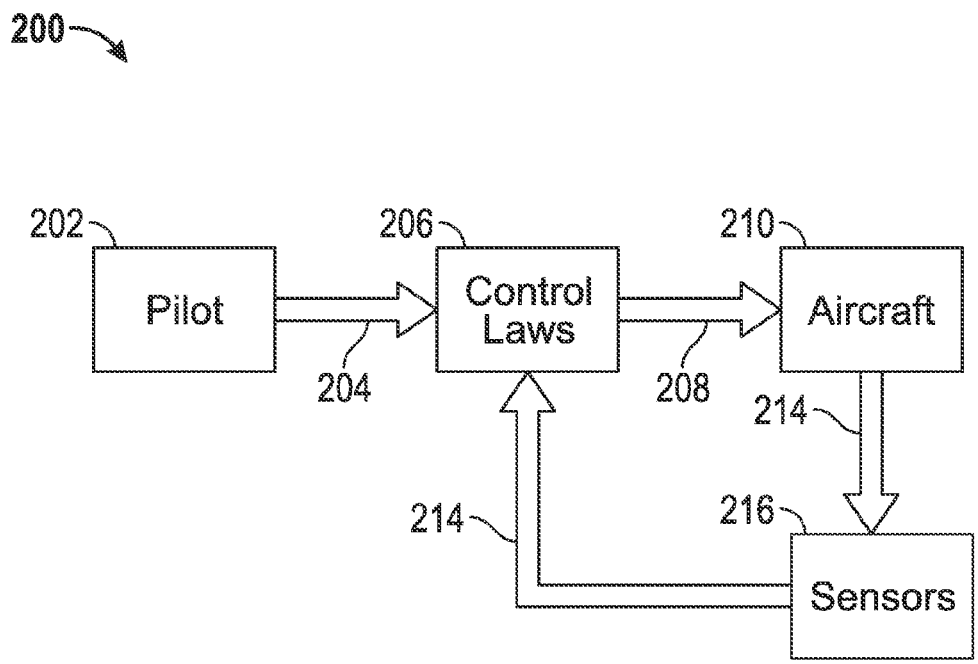
FIG. 2 illustrates a block diagram of an exemplary aircraft system.

FIG. 2 illustrates a block diagram 200 of a system for automated rotating tail rotor control in accordance with one or more embodiments. The block diagram 200 may be implemented by one or more systems, devices, or components, such as those described herein. For example, the block diagram 200 may be implemented in connection with the system 100 of FIG. 1.

As shown in FIG. 2, a user (e.g., a pilot 202) may issue one or more commands 204. The commands 204 may correspond to directives that the pilot 202 issues, which may represent a request to command an aircraft to a particular state. The commands 204 may be generated in response to actuation or movement of a device located in a cockpit.

The commands 204 may be received by a control computer that may implement or run one or more control laws. The control computer/control laws 206 may provide controls 208 to an aircraft 210. The control computer/control laws 206, or the aircraft 210, may adhere to a fly-by-wire (FBW) configuration.

The controls 208 may regulate operation of one or more devices or components associated with the aircraft 210. The controls 208 may regulate a mode or state of operation associated with the aircraft 210. For example, the controls 208 may dictate whether the aircraft 210 is operating in a pusher propeller mode or a tail rotor mode.

When the pilot 202 commands the aircraft 210 to transition (e.g., convert from tail rotor configuration to pusher propeller configuration or back), the control computer/control laws 206 may monitor an airspeed and collective power setting 214, as potentially detected by one or more control inputs or sensors 216, to determine if the rudder of the aircraft 210 is capable of providing the needed anti-torque to maintain directional control. When the control computer/control laws 206 determines that the rudder has enough control power (e.g., control power in an amount greater than a threshold), the control computer/control laws 206 may switch a yaw axis trim control to the rudder so that the rudder may move to the trim position. More generally, a trim position may correspond to the control position(s) or control inputs that satisfy a particular aircraft position or condition.

In some embodiments, a trim map for the rudder may be used when in tail rotor mode to ensure that the rudder is close to the trim position before starting a transition from, e.g., the tail rotor mode to the pusher propeller mode. When the rudder approaches the trim position (e.g., in an amount less than a threshold), the control computer/control laws 206 may cause the rotating tail rotor to swivel. As the rotating tail rotor is swiveled to the pusher propeller mode, high frequency yaw axis control paths may be transitioned to drive the rudder. During the transition, the yaw axis feedback gains may be transitioned to gain tuned for the rudder control. Once swiveled, the aircraft 210 may be in the pusher propeller mode and the rotating tail rotor's trim collective position may become a thrust control.

When in the pusher propeller mode, the control computer/control laws 206 may monitor the aircraft speed and collective settings 214 until they approach the realm where the rudder lacks the required control power (e.g., where the rudder control power is less than a threshold). In this case, or in the event of an emergency such as a loss of rudder control, a transition may be initiated from the pusher propeller mode to the tail rotor mode. As part of the transition from the pusher propeller mode to the tail rotor mode, the rotating tail rotor may be automatically swiveled to the tail rotor mode and command paths and feedback gains may be switched back in the reverse of the transition to the pusher propeller mode.

Figure 3:
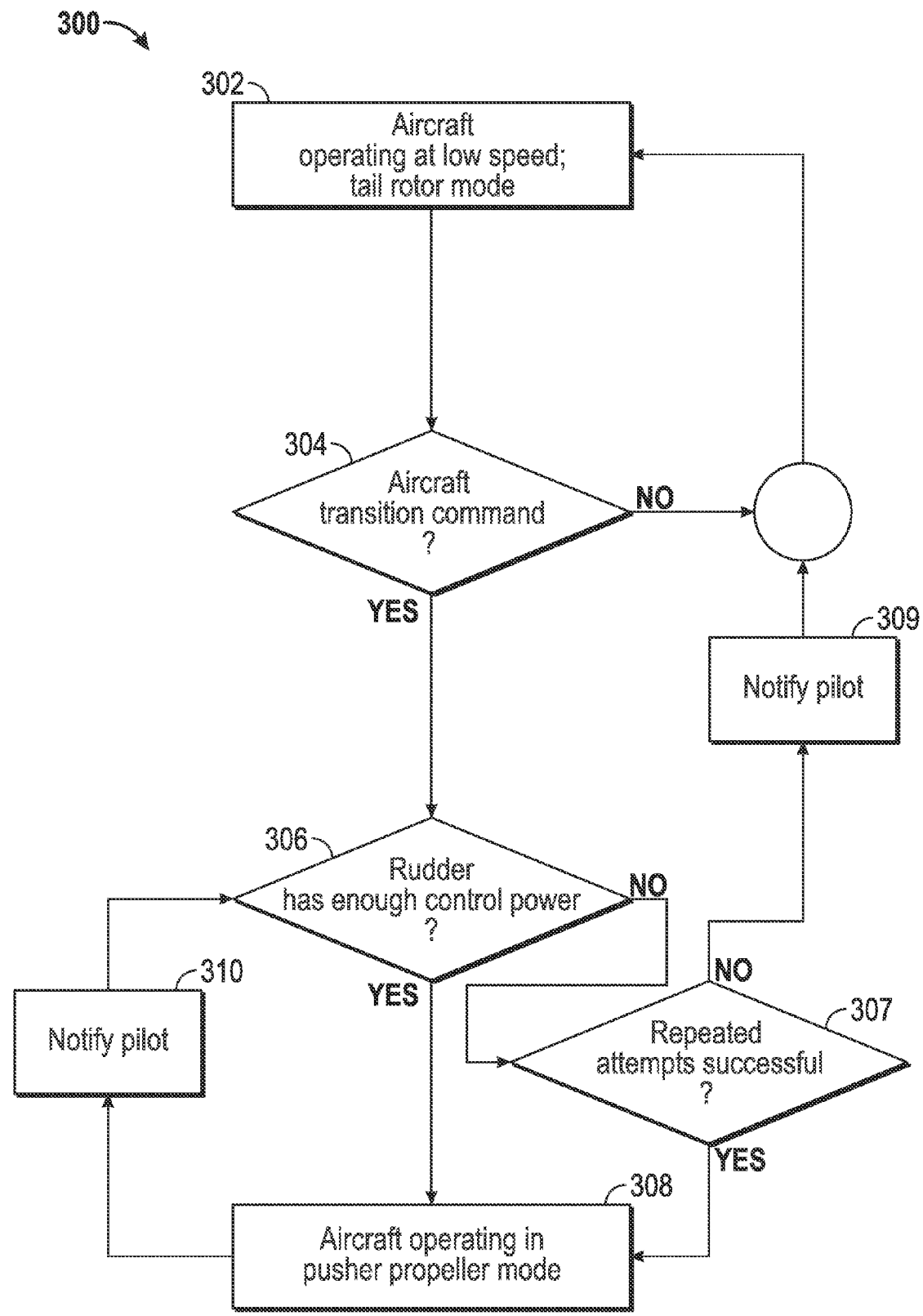
FIG. 3 is a flow chart of an exemplary method.

Turning to FIG. 3, a flow chart of a method 300 is shown. The method 300 may be executed in connection with one or more components, devices, or systems, such as those described herein. The method may be used to transition between a tail rotor mode and a pusher propeller mode.

In block 302, an aircraft may be operating at a low speed (e.g., a speed less than a threshold), which may be associated with a tail rotor mode.

In block 304, a determination may be made whether a command issued by the pilot indicates a request to transition the aircraft. If so (e.g., the "Yes" path is taken out of block 304), flow may proceed from block 304 to block 306. Otherwise (e.g., the "No" path is taken out of block 304), flow may proceed from block 304 to block 302.

In block 306, a determination may be made whether a rudder has enough control power (e.g., power in an amount greater than a threshold) to support operating in the pusher propeller mode. If so (e.g., the "Yes" path is taken out of block 306), flow may proceed from block 306 to block 308. Otherwise (e.g., the "No" path is taken out of block 306), to block 307. Block 307 may store the command issued by the pilot to repeatedly attempt (e.g., N times) to perform the transition from tail rotor mode and to pusher propeller mode. If the repeated attempts are successful, flow proceeds to block 308. If the repeated attempts are not successful, the pilot may be notified of the failure to transition to pusher propeller mode at 309 and flow proceeds to 302.

In block 308, the aircraft may operate in the pusher propeller mode. From block 308, flow may proceed to block 310 where the pilot is notified of successful transition from tail rotor mode and to pusher propeller mode. Flow proceeds to 306, where the aircraft will stay in pusher propeller mode until the rudder lacks the control power or the pilot commands a return to tail rotor mode.

In some embodiments, one or more of the blocks or operations (or a portion thereof) of the method 300 may be optional. In some embodiments, the blocks may execute in an order or sequence different from what is shown in FIG. 3. In some embodiments, one or more additional blocks or operations not shown may be included.

Figure 4:
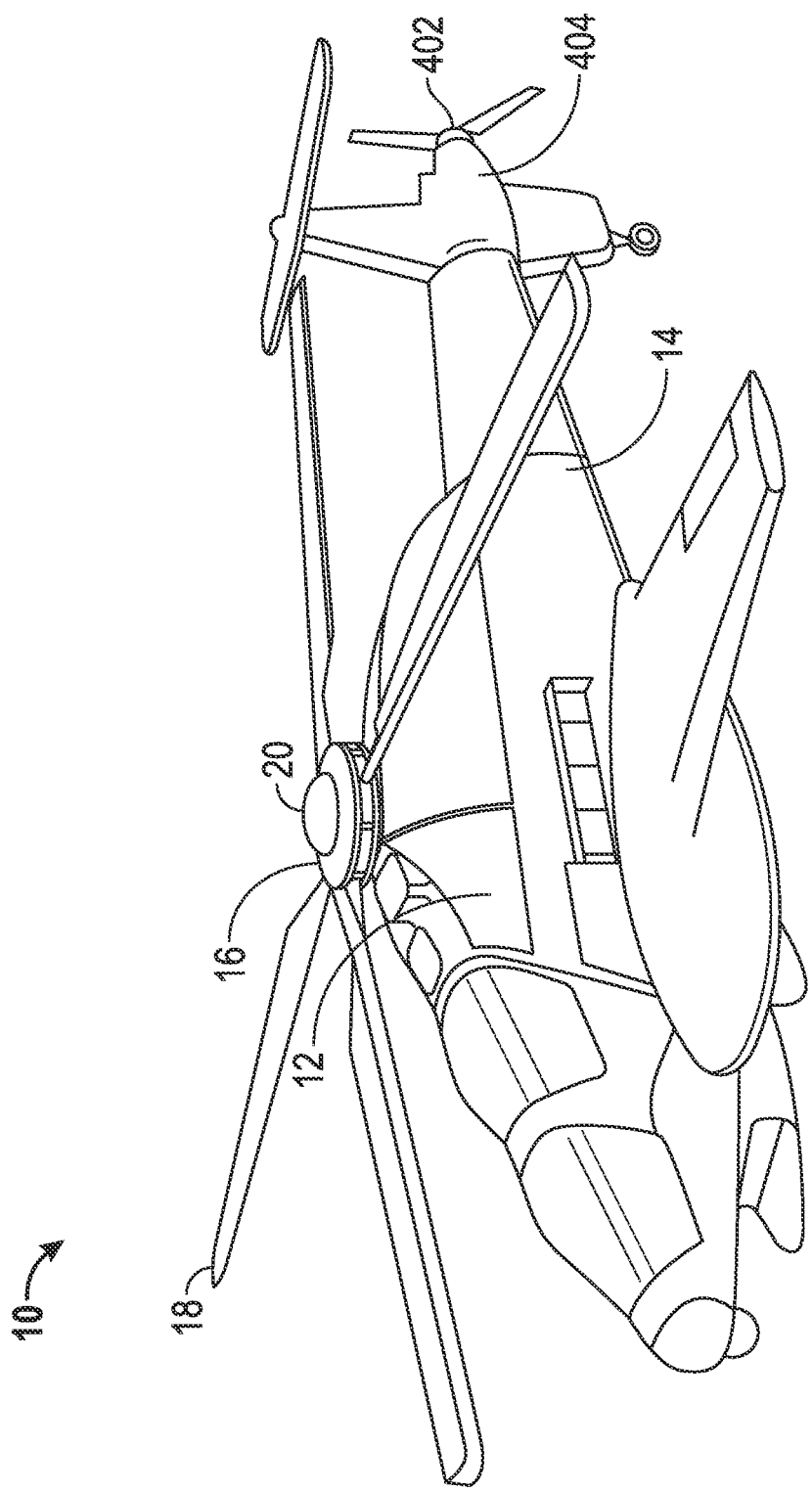
FIG. 4 is a perspective view of an exemplary rotary wing aircraft.

FIG. 4 schematically illustrates a rotary-wing aircraft 10 including a fuselage 12 having an extended tail 14. A main rotor assembly 16 is mounted on the top of the airframe. The main rotor assembly 16 is driven about an axis of rotation A through a main gearbox by one or more engines. The main rotor assembly 16 connects blades 18 to a rotor hub 20. The aircraft 10 may include a rotating tail rotor 402. The rotating tail rotor 402 is shown in a pusher propeller position. The rotating tail rotor 402 may be mounted on a swivel 404 to be controllably moved to a tail rotor position (not shown).

Although a particular helicopter configuration is illustrated and described in the disclosed non-limiting embodiment of FIG. 4, other configurations and/or machines, such as high speed compound rotary wing aircraft with supplemental translational thrust systems, dual contra-rotating coaxial rotor system aircraft, turboprops, tilt-rotors, and tilt-wing aircraft, will also benefit from the present disclosure.

Embodiments of the disclosure may be used to provide automatic control of a rotating tail rotor. The control may determine the conditions for which the rotating tail rotor position is commanded to an anti-torque position (e.g., tail rotor mode), a pusher propeller position (e.g., pusher propeller mode), and any intermediate positions. The automatic control may relieve a pilot of having to actively control the position of the rotating tail rotor. The position of the rotating tail rotor may be controlled to satisfy performance criteria associated with the aircraft. Examples of additional criteria include: the ability to accelerate the aircraft while maintaining a particular pitch attitude, the maintenance of adequate control margins throughout a flight envelope, and a reduction of transients during a transition from low speed to high speed with automatic control mixing and feedback stabilization.

Embodiments of the disclosure may (adaptively) be used in connection with one or more aircraft. An example of such a compound aircraft configuration includes Sikorsky's S-66 design.

Embodiments of this disclosure may be tied to one or more particular machines. For example, one or more computers, devices, or architectures may be configured to automatically control the position of a rotating tail rotor. A transition between positions or modes may be based on one or more factors, such as the type of aircraft, the weight of the aircraft, aerodynamic principles, etc.

As described herein, in some embodiments various functions or acts may take place at a given location and/or in connection with the operation of one or more apparatuses, systems, or devices. For example, in some embodiments, a portion of a given function or act may be performed at a first device or location, and the remainder of the function or act may be performed at one or more additional devices or locations.

Embodiments may be implemented using one or more technologies. In some embodiments, an apparatus or system may include one or more processors, and a memory storing instructions that, when executed by the one or more processors, cause the apparatus or system to perform one or more methodological acts as described herein. Various mechanical components known to those of skill in the art may be used in some embodiments.

Embodiments may be implemented as one or more apparatuses, systems, and/or methods. In some embodiments, instructions may be stored on one or more computer-readable media, such as a transitory and/or non-transitory computer-readable medium. The instructions, when executed, may cause an entity (e.g., an apparatus or system) to perform one or more methodological acts as described herein.

Aspects of the disclosure have been described in terms of illustrative embodiments thereof. Numerous other embodiments, modifications and variations within the scope and spirit of the appended claims will occur to persons of ordinary skill in the art from a review of this disclosure. For example, one of ordinary skill in the art will appreciate that the steps described in conjunction with the illustrative figures may be performed in other than the recited order, and that one or more steps illustrated may be optional.

What is claimed is:

1. A method comprising:
    causing, by a computing device comprising a processor, a rotating tail rotor to operate in a tail rotor mode when an aircraft is operating at a speed less than a rudder control power threshold;
    receiving, by the computing device, a command that indicates a request to transition the aircraft;
    determining, by the computing device, that a rudder of the aircraft has control power in an amount greater than a second threshold based on receiving the command; and
    causing, by the computing device, the rotating tail rotor to operate in a pusher propeller mode based on determining that the rudder has control power in the amount greater than the second threshold.

2. The method of claim 1, further comprising:
    monitoring, by the computing device, airspeed and a collective power setting to determine that the rudder has control power in the amount greater than the second threshold.

3. The method of claim 1, further comprising:
    causing, by the computing device, a yaw axis trim control to switch to the rudder to move the rudder to a trim position based on determining that the rudder has control power in the amount greater than the second threshold.

4. The method of claim 3, further comprising:
    causing, by the computing device, the rotating tail rotor to swivel based on the rudder approaching the trim position within a third threshold.

5. The method of claim 4, further comprising:
    causing, by the computing device, yaw axis control paths to transition to drive the rudder.

6. The method of claim 1, further comprising:
    causing, by the computing device, yaw axis feedback gains to transition to gains that are tuned for rudder control based on determining that the rudder has control power in the amount greater than the second threshold.

7. The method of claim 1, further comprising:
    determining, by the computing device, that the rudder of the aircraft has control power in an amount less than a third threshold when the rotating tail rotor is operating in the pusher propeller mode; and
    causing, by the computing device, the rotating tail rotor to operate in the tail rotor mode based on determining that the rudder has control power in the amount less than the third threshold.

8. The method of claim 7, further comprising:
    monitoring, by the computing device, airspeed and a collective power setting to determine that the rudder has control power in the amount less than the third threshold.

9. The method of claim 7, wherein the second threshold and third threshold are different.

10. An apparatus comprising:
    at least one processor; and
    memory having instructions stored thereon that, when executed by the at least one processor, cause the apparatus to:
        cause a rotating tail rotor to operate in a tail rotor mode when an aircraft is operating at a speed less than a threshold;
        receive a command that indicates a request to transition the aircraft;
        determine that a rudder of the aircraft has control power in an amount greater than a second threshold based on receiving the command; and
        cause the rotating tail rotor to operate in a pusher propeller mode based on determining that the rudder has control power in the amount greater than the second threshold.

11. The apparatus of claim 10, wherein the instructions, when executed by the at least one processor, cause the apparatus to:
    monitor airspeed and a collective power setting to determine that the rudder has control power in the amount greater than the second threshold.

12. The apparatus of claim 10, wherein the instructions, when executed by the at least one processor, cause the apparatus to:
    cause a yaw axis trim control to switch to the rudder to move the rudder to a trim position based on determining that the rudder has control power in the amount greater than the second threshold.

13. The apparatus of claim 12, wherein the instructions, when executed by the at least one processor, cause the apparatus to:
    cause the rotating tail rotor to swivel based on the rudder approaching the trim position within a third threshold.

14. The apparatus of claim 13, wherein the instructions, when executed by the at least one processor, cause the apparatus to:
   cause yaw axis control paths to transition to drive the rudder.

15. The apparatus of claim 10, wherein the instructions, when executed by the at least one processor, cause the apparatus to:
   cause yaw axis feedback gains to transition to gains that are tuned for rudder control based on determining that the rudder has control power in the amount greater than the second threshold.

16. The apparatus of claim 10, wherein the instructions, when executed by the at least one processor, cause the apparatus to:
   determine that the rudder of the aircraft has control power in an amount less than a third threshold when the rotating tail rotor is operating in the pusher propeller mode; and
   cause the rotating tail rotor to operate in the tail rotor mode based on determining that the rudder has control power in the amount less than the third threshold.

17. The apparatus of claim 16, wherein the instructions, when executed by the at least one processor, cause the apparatus to:
   monitor airspeed and a collective power setting to determine that the rudder has control power in the amount less than the third threshold.

18. The apparatus of claim 16, wherein the second threshold and third threshold are different.

19. The apparatus of claim 16, wherein the rudder has control power in the amount less than the third threshold when there is an emergency loss of rudder control.

20. A system comprising:
   at least one sensor configured to measure aircraft speed; and
   a control computer configured to:
      cause a rotating tail rotor to operate in a tail rotor mode when an aircraft is operating at a speed less than a threshold as detected by the at least one sensor;
      receive a command that indicates a request to transition the aircraft;
      determine that a rudder of the aircraft has control power in an amount greater than a second threshold based on receiving the command;
      cause the rotating tail rotor to operate in a pusher propeller mode based on determining that the rudder has control power in the amount greater than the second threshold;
      determine that the rudder has control power in an amount less than a third threshold when the rotating tail rotor is operating in the pusher propeller mode; and
      cause the rotating tail rotor to operate in the tail rotor mode based on determining that the rudder has control power in the amount less than the third threshold.

* * * * *